United States Patent Office 3,079,345
Patented Feb. 26, 1963

3,079,345
PROPARGYL COMPOUNDS AS CORROSION INHIBITORS
Roger F. Monroe and Fred J. Lowes, Midland, Mich., and Gerald L. Foster and Billy D. Oakes, Tulsa, Okla., assignors to The Dow Chemical Company, Midland, Mich., a corporation of Delaware
No Drawing. Filed Apr. 30, 1959, Ser. No. 809,909
9 Claims. (Cl. 252—148)

This invention relates to corrosion inhibitors for use in aqueous, non-oxidizing acids to inhibit the corrosion of iron, steel, nickel and ferrous alloys by such acids.

The corrosion inhibitors of this invention are the propargyl compounds corresponding to the formula

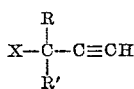

wherein X is —$NH_2$, —$NHC_6H_5$, —$N(CH_3)_2$, or —Cl; R is —H, hydrocarbon or carboxyl and R' is —H or lower alkyl.

According to the invention, a propargyl compound corresponding to the above formula is dissolved in the aqueous acid the corrosive action of which is to be inhibited. By "aqueous acid" we mean any composition comprising a nonoxidizing acid and water and do not mean to exclude the presence of other substances. By "lower alkyl" we mean alkyl radicals containing not more than four carbon atoms.

Only a small amount of the inhibitor is needed. As little as a few thousandths of 1 percent, based on the aqueous acid, significantly reduces the corrosion of iron, steel or nickel exposed to the acid. The degree of inhibition increases with the concentration of the inhibitor up to a level of about 1 percent. Beyond this point little added protection of the metal is obtained by the use of more inhibitor. We generally prefer to use our inhibitors at a level of about 0.1 to 0.4 percent, this amount being adequate for most purposes.

The inhibitors of the invention are effective not only at ordinary temperatures but also at elevated temperatures up to the decomposition point of the inhibitors. All are effective at 150° and some at 200° F. Moreover, they are effective in various concentrations of acids, even including hydrochloric acid up to 37 percent, that is, commercial concentrated acid.

Applications in which the inhibitors are particularly useful include metal-pickling, cleaning and polishing baths, oil well-acidizing solutions, boiler-cleaning compositions and the like.

The inhibitors of this invention are either commercially available or are easily made from commercially available intermediates.

The propargyl alcohols are easily prepared from acetylene and the appropriate carbonyl compound by well known methods, such as that of Froning and Hennion, J. Am. Chem. Soc., 62, 653 (1940). The corresponding chlorides are easily made from the alcohols by adding the latter dropwise to 2 volumes of concentrated hydrochloric acid containing a catalytic amount (1 percent) of CuCl, the temperature being kept below about 30° C. The product is then recovered by separating, washing and distilling the organic layer. The amines may be prepared from the chlorides by shaking the latter with an equal volume of concentrated $NH_4OH$ or a slight excess of aniline or dimethylamine containing a catalytic amount of CuCl at ordinary temperature for several hours, and then separating the organic layer, washing it, and distilling it under reduced pressure.

In order to demonstrate the effectiveness of our inhibitors a series of tests was run in which 0.4 percent of the inhibitor was put into a 10 percent aqueous solution of hydrochloric acid held at 150° F. and a coupon of the metal to be tested was suspended in the solution for 16 hrs. Thereafter the coupon was cleaned, dried and weighed to determine the amount of metal dissolved. Table I shows the result of such tests with AISI–1020 steel.

TABLE I

Corrosion of Mild Steel by 10 Percent HCl in the Presence of 0.4 Percent of an Inhibitor Having the Formula

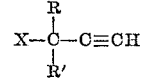

| Example No. | X | R | R' | Corrosion, lb./sq. ft./day | |
|---|---|---|---|---|---|
| | | | | 150° F. | 175° F. |
| 1 | $NHC_6H_5$ | H | H | | .186 |
| 2 | $N(CH_3)_2$ | H | H | | .276 |
| 3 | $NH_2$ | COOH | H | .025 | |
| 4 | Cl | H | H | .092 | |
| 5 | Cl | $CH_3$ | $CH_3$ | .728 | |
| 6 | (no inhibitor) | | | >1 | |

Homologs of the compounds in Table I wherein R and R' may contain up to at least four carbon atoms are also effective corrosion inhibitors.

Results generally paralleling those shown in Table I were obtained when similar tests were run at lower temperatures, with lower or higher concentrations of HCl, or with other ferrous metals or nickel as the test metal. Likewise, other non-oxidizing acids, such as phosphoric, sulfuric and acetic acids are similarly inhibited.

Particularly effective inhibitors are obtained by having R in the above formula be a 2,4,6-trimethyl-3-cyclohexene-1-yl group while less potent, but effective, compounds are obtained by having R be a phenyl radical.

This application is a continuation-in-part of our copending application Serial No. 604,315, filed August 16, 1956, now abandoned.

We claim:

1. An aqueous solution of a non-oxidizing acid containing as a corrosion inhibitor an effective amount of at least one compound corresponding to the formula

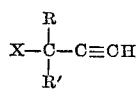

wherein X is a member selected from the group consisting of —Cl, —$NH_2$, —$NHC_6H_5$ and —$N(CH_3)_2$; R is a member selected from the group consisting of hydrogen, alkyl radicals containing 1 to 4 carbon atoms, 2,4,6-trimethyl-3-cyclohexen-1-yl, phenyl and carboxyl radicals; and R' is a member selected from the group consisting of hydrogen and alkyl radicals containing 1 to 4 carbon atoms.

2. A solution as in claim 1 wherein X is Cl.
3. A solution as in claim 1 wherein X is —$NH_2$.
4. A solution as in claim 1 wherein R is —H.
5. A solution as in claim 1 wherein R is an alkyl group containing 1 to 4 carbon atoms.
6. A solution as in claim 1 wherein R is phenyl.
7. A solution as in claim 1 wherein R is 2,4,6-trimethyl-3-cyclohexen-1-yl.

8. An aqueous solution as defined in claim 1 wherein the concentration of the corrosion inhibitor is about 0.1 to 1 percent, by weight.

9. A process for inhibiting the corrosive action of an aqueous solution of a non-oxidizing acid on a metal of the group consisting of iron, steel, nickel and ferrous alloys comprising maintaining in said solution an effective concentration of the corrosion inhibitor defined in claim 1 while said solution is in contact with said metal.

References Cited in the file of this patent

UNITED STATES PATENTS

| | | |
|---|---|---|
| 1,877,504 | Grebe et al. | Sept. 13, 1932 |
| 2,603,622 | Berger et al. | July 15, 1952 |
| 2,806,067 | Monroe et al. | Sept. 10, 1957 |
| 2,913,408 | Pumpelly et al. | Nov. 17, 1959 |

FOREIGN PATENTS

| | | |
|---|---|---|
| 235,291 | Switzerland | Apr. 3, 1945 |
| 468,231 | Italy | Dec. 29, 1951 |
| 1,024,773 | Germany | Feb. 20, 1958 |